(12) United States Patent
Shiozawa et al.

(10) Patent No.: US 10,866,189 B2
(45) Date of Patent: Dec. 15, 2020

(54) OPTICAL MEASUREMENT APPARATUS AND OPTICAL MEASUREMENT METHOD

(71) Applicant: Hitachi, Ltd., Tokyo (JP)

(72) Inventors: Manabu Shiozawa, Tokyo (JP); Kakuro Hirai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 15/778,356

(22) PCT Filed: Nov. 24, 2015

(86) PCT No.: PCT/JP2015/082815
§ 371 (c)(1),
(2) Date: May 23, 2018

(87) PCT Pub. No.: WO2017/090075
PCT Pub. Date: Jun. 1, 2017

(65) Prior Publication Data
US 2018/0348138 A1    Dec. 6, 2018

(51) Int. Cl.
*G01N 21/65* (2006.01)
*G01J 3/02* (2006.01)
*G01J 3/44* (2006.01)

(52) U.S. Cl.
CPC ............ *G01N 21/65* (2013.01); *G01J 3/0208* (2013.01); *G01J 3/44* (2013.01); *G01N 2021/653* (2013.01); *G01N 2201/06113* (2013.01)

(58) Field of Classification Search
CPC ...... G01N 21/65; G01N 2021/653; G01J 3/44
See application file for complete search history.

(56) References Cited

U.S. PATENT DOCUMENTS

| | | |
|---|---|---|
| 6,108,081 A | 8/2000 | Holtom et al. |
| 2005/0168735 A1 | 8/2005 | Boppart et al. |
| 2006/0219710 A1 | 10/2006 | McManus et al. |
| 2010/0046039 A1 | 2/2010 | Xie et al. |
| 2011/0122407 A1 | 5/2011 | Jalali et al. |
| 2012/0092662 A1 | 4/2012 | Langbein et al. |

(Continued)

FOREIGN PATENT DOCUMENTS

| | | |
|---|---|---|
| JP | 2006-281208 A | 10/2006 |
| JP | 2009-222531 A | 10/2009 |

(Continued)

OTHER PUBLICATIONS

Nikon"Inverted Microscope Eclipse TE2000-E Eclipse TE2000-U Eclipse TE2000-S" (Year: Not available).*

(Continued)

*Primary Examiner* — Maurice C Smith
(74) *Attorney, Agent, or Firm* — Crowell & Moring LLP

(57) ABSTRACT

In multicolor Coherent anti-Stokes Raman Scattering, a fingerprint region is a region densely filled with signals, and information about an intensity or spatial distribution of the signals is important for cell analysis. However, when laser power was increased due to the low signal intensity, there was a problem that cells were damaged. Thus, the present invention was configured such that the number of pulses of laser light emitted from a short pulse laser light source was changed by a pulse modulator. Accordingly, damage to the cells can be suppressed without significant reduction in signal intensity.

12 Claims, 11 Drawing Sheets

(56) References Cited

U.S. PATENT DOCUMENTS

| | | | |
|---|---|---|---|
| 2012/0307238 A1* | 12/2012 | Fujita | G02B 21/002 356/301 |
| 2013/0215422 A1 | 8/2013 | Kimura et al. | |
| 2014/0009826 A1* | 1/2014 | Fukutake | G02B 21/18 359/385 |
| 2014/0353504 A1 | 12/2014 | Naito et al. | |
| 2015/0198535 A1 | 7/2015 | Yamazoe et al. | |
| 2015/0369742 A1 | 12/2015 | Tamada et al. | |
| 2016/0076940 A1 | 3/2016 | Kimura | |

FOREIGN PATENT DOCUMENTS

| | | | |
|---|---|---|---|
| JP | 2010-48805 A | 3/2010 | |
| JP | 2012-521001 A | 9/2012 | |
| JP | 2013-511718 A | 4/2013 | |
| JP | 2013-171154 A | 9/2013 | |
| JP | 2013-205079 A | 10/2013 | |
| JP | 2014-70928 A | 4/2014 | |
| JP | WO2014125729 A1 * | 8/2014 | G01N 21/65 |
| JP | 2015-7612 | 1/2015 | |
| WO | WO 2014/125729 A1 | 8/2014 | |
| WO | WO 2015/025389 A1 | 2/2015 | |

OTHER PUBLICATIONS

International Search Report (PCT/ISA/210) issued in PCT Application No. PCT/JP2015/082815 dated Feb. 23, 2016 with English-language translation (Ten (10) pages).

Japanese-language Written Opinion (PCT/ISA/237) issued in PCT Application No. PCT/JP2015/082815 dated Feb. 23, 2016 (seven (7) pages).

* cited by examiner

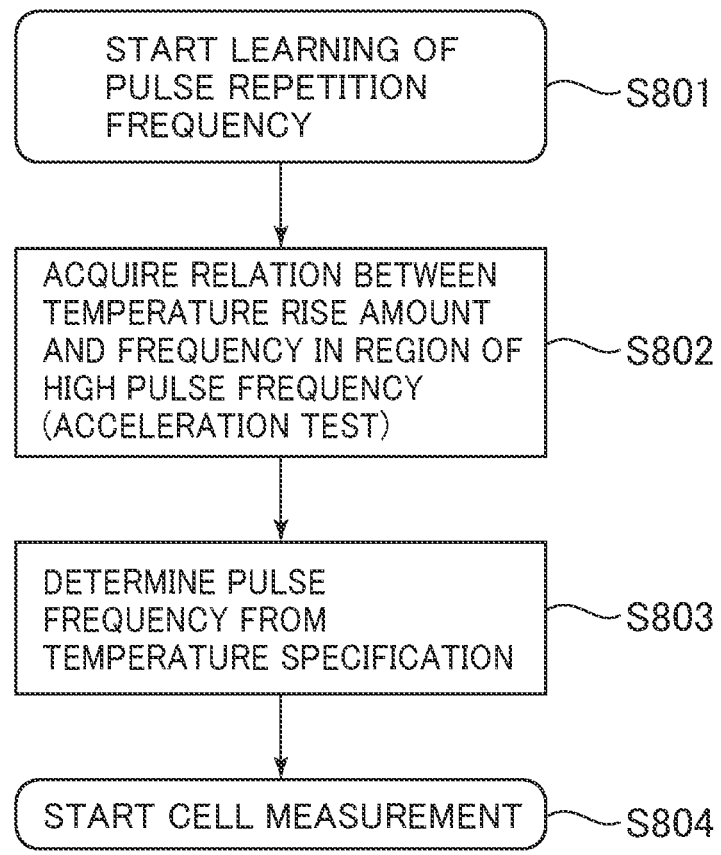
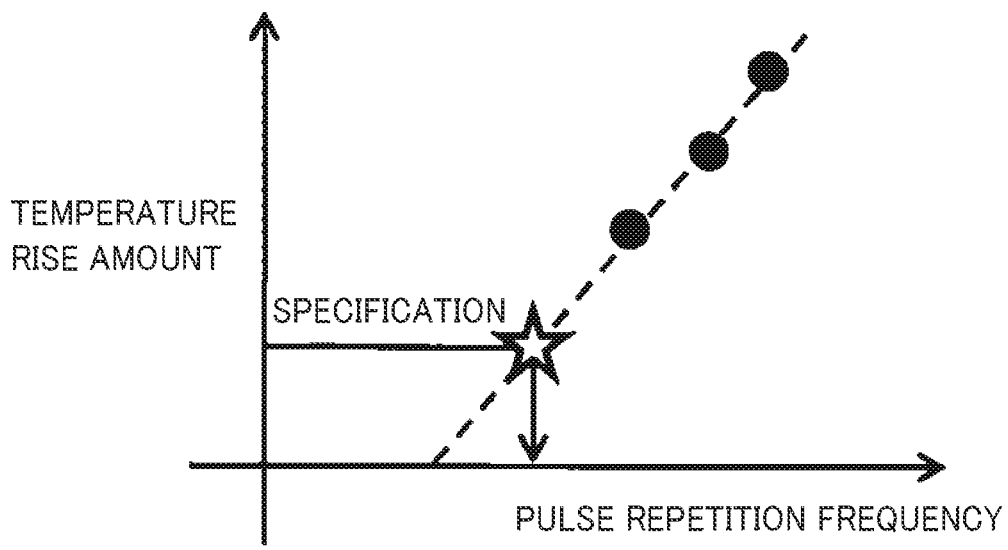

OPTICAL MEASUREMENT APPARATUS AND OPTICAL MEASUREMENT METHOD

TECHNICAL FIELD

The present invention relates to an optical measurement apparatus and an optical measurement method utilizing Coherent anti-Stokes Raman Scattering.

BACKGROUND ART

The optical microscope has been developed as an indispensable apparatus in the fields of the natural science, engineering, and industry. In recent years particularly, needs of the higher functionality have increased for use in cell observation in the fields of regenerative medicine and drug discovery. In current cell analysis, such method is common that cells are stained using a test reagent and are observed by a microscope and the like. However, according to this method, it is hard to analyze the same cell continuously or to use inspected cells directly in medical care because of influence to the cells by staining.

The CARS (Coherent anti-Stokes Raman Scattering) microscope is suitable to the use of cell observation because it can identify a molecule at a higher speed compared to a Raman microscope by application of the non-linear optical effect and it has the non-invasive feature.

CARS is light emission by tertiary polarization, and the pump light, Stokes light, and probe light are required to generate CARS. In general, in order to reduce the number of light sources, the pump light is used as a substitute for the probe light. In this case, tertiary polarization excited is expressed by:

$$P_{AS}^{(3)}(\omega_{AS}) = |\chi_r^{(3)}(\omega_{AS}) + \chi_{nr}^{(3)}|E_p^2(\omega_P)E^*_S(\omega_S)$$

Here, $\chi_r^{(3)}(\omega_{AS})$ is the resonance term of the molecular vibration of the tertiary electric susceptibility, and $\chi_{nr}^{(3)}$ which has no dependency on frequency is the non-resonance term. Also, the electric field of the pump light and the probe light is expressed by $E_P$, and the electric field of the Stokes light is expressed by $E_S$. In the above expression, the asterisk given at the shoulder of $E_S$ expresses the complex conjugation. The intensity of the CARS light is expressed as the following.

$$I_{CARS}(\omega_{AS}) \propto |P_{AS}^{(3)}(\omega_{AS})|^2$$

FIG. 2 is an energy level diagram in CARS. The mechanism of generation of the CARS light will be explained using the energy level diagram of a molecule shown in FIG. 2. The present drawing shows a process of the resonance term. 201 expresses the ground state of the molecule, and 202 expresses the vibration exciting state. The pump light at the frequency cop and the Stokes light at the frequency $\omega_S$ are irradiated simultaneously. At this time, the molecule is excited to a certain vibration exciting level of 202 by way of the intermediate state 203. When the probe light at the frequency $\omega_P$ is irradiated to the molecule in this vibration exciting state, the state of the molecule returns to the ground state while generating the CARS light at the frequency $\omega_{AS}$ by way of the intermediate state 204. The frequency of the CARS light then is expressed as $\omega_{AS} = 2 \cdot \omega_P - \omega_S$.

Out of the tertiary polarization described above, one process related with the non-resonance term $\chi_{nr}^{(3)}$ is shown in FIG. 3. This is the process in which the state excited by simultaneous irradiation of the pump light at the frequency $\omega_P$ and the Stokes light at the frequency $\omega'_S$ is not the vibration exciting state, but the intermediate state of 205 is excited. By irradiation of the probe light at the frequency $\omega_P$, non-resonance CARS light at the frequency $\omega_{AS}$ is generated by way of the intermediate state 204.

Out of the CARS microscopes, that spectroscopically detects generated CARS light using a broadband light source as the Stokes light as shown in FIG. 4 is called a multi-color CARS microscope (or a multiplex CARS microscope), and the configurations and the like have been disclosed in Patent Literature 2 for example. Since the Raman spectrum can be estimated from the spectral spectrum of the CARS light, the multi-color CARS microscope is richer in acquirable information compared to a method that detects only a predetermined spectrum component as described in Patent Literature 1 (this is conveniently referred to as mono-color CARS), and is suitable to more detailed analysis of the measurement object.

FIG. 5 is a drawing that shows a configuration of a multi-color CARS microscope according to a prior art. The output from a short pulse laser light source 501 is branched into two by a beam splitter 502, one is introduced to an optical fiber such as a photonic crystal fiber 503, and broadband light (is also referred to as super-continuum light) is generated inside. With respect to the super-continuum light, only a desired wavelength component (a component having longer wavelength compared to the excited light) is extracted by a long path filter 504 after emittance from the fiber, and it is used as the Stokes light. The other excited light and the Stokes light are multiplexed by a dichroic mirror 505 and the like and are condensed and irradiated onto a sample 506, the CARS light is generated which is detected by a spectroscope 507, and the spectrum is acquired.

CITATION LIST

Patent Literatures

Patent Literature 1: Specification of U.S. Pat. No. 6,108, 081

Patent Literature 2: Japanese Unexamined Patent Application Publication No. 2009-222531

Patent Literature 3: Japanese Unexamined Patent Application Publication No. 2015-7612

SUMMARY OF INVENTION

Technical Problem

In order to evaluate the differentiated state and the active state of a cell by the CARS microscope, it is suitable to utilize the fingerprint region (approximately 800 to 1,800 $cm^{-1}$) where many peaks corresponding to the composition of a biological body are closely spaced. Since the signal of the fingerprint region is approximately $1/10$ with respect to the CH elastic signal of approximately 2,900 $cm^{-1}$ which is reported mainly in research papers and the like, it is necessary to improve the signal-to-noise ratio of the signal. However, in the case of increasing irradiated laser power in order to increase the signal intensity, there has been a possibility of causing damage to the cells.

Solution to Problem

Therefore, the present inventors paid attention to the non-linear optical effect of CARS, and invented a measurement apparatus that suppresses the damage without largely reducing the signal intensity. Since the signal intensity of CARS is proportional to the square of the pump light and the first power of the Stokes light, when the power of the laser is reduced, the signal intensity reduces in proportion to the cube of the power of the laser. Therefore, an optical measurement apparatus of an embodiment of the present invention is featured to include a short pulse laser light source, a modulator that modulates power of predetermined pulses out of pulses of laser light so as to reduce the power, the laser light being generated from the short pulse laser light source, a branching unit that branches emission light emitted from the short pulse laser light source byway of the modulator into a first light flux and a second light flux, an optical fiber that generates super-continuum light from the first light flux, a multiplex unit that multiplexes Stokes light and pump light, the Stokes light being a long wavelength component out of the super-continuum light, the pump light being the second light flux, a condensing optical system that condenses light multiplexed by the multiplex unit on a sample, and a spectroscope that detects light generated from the sample.

Advantageous Effects of Invention

According to the present invention, damage to cells can be suppressed without largely reducing the signal intensity of CARS.

BRIEF DESCRIPTION OF DRAWINGS

FIG. 8 is an example of a flowchart that shows motions of learning and determining the pulse frequency by an apparatus that is according to the present invention.
FIG. 9 is the relation between the pulse frequency and the temperature rise after irradiation for a predetermined time.

DESCRIPTION OF EMBODIMENTS

First Embodiment

Figure 1A:
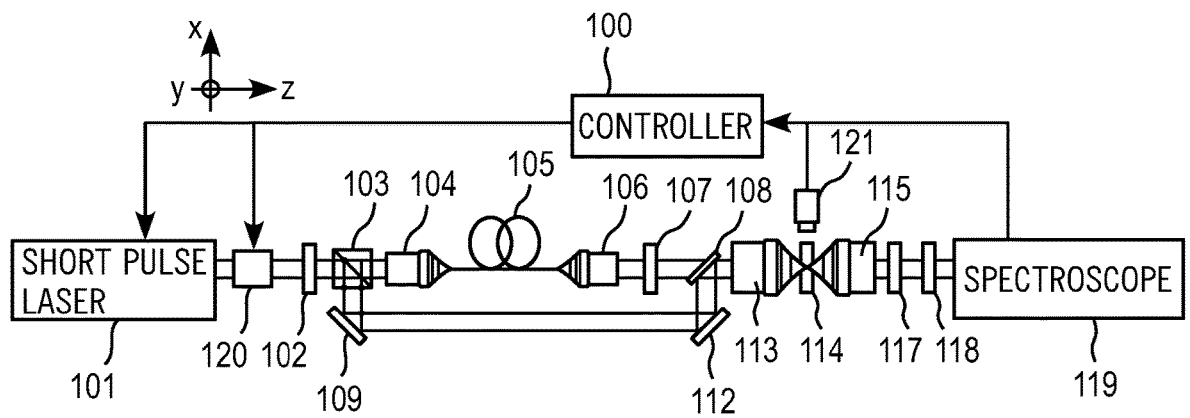
FIG. 1A and B are schematic view that show basic configuration examples according to the present invention.
Figure 1B:
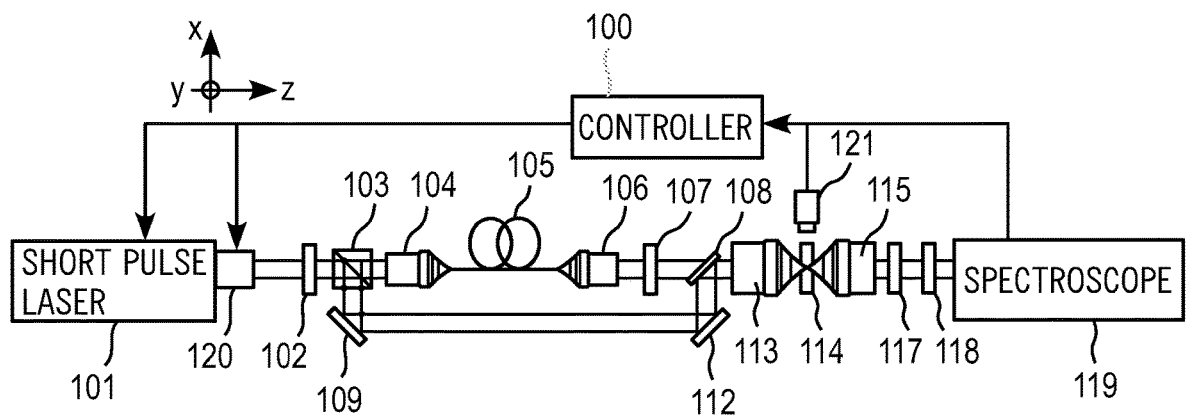
Figure 2:
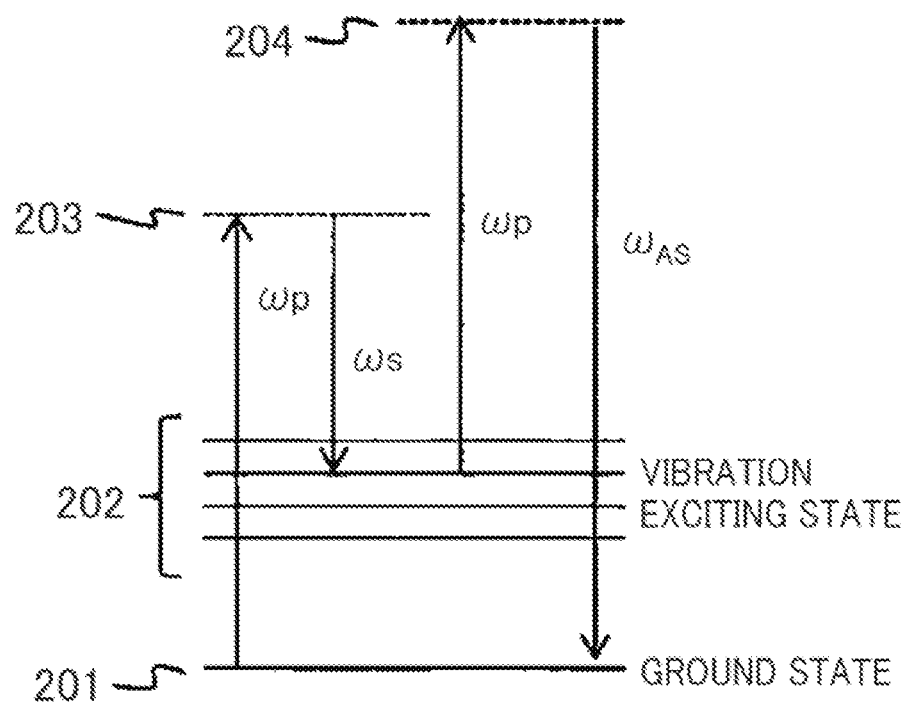
FIG. 2 is an energy level diagram in CARS.
Figure 3:
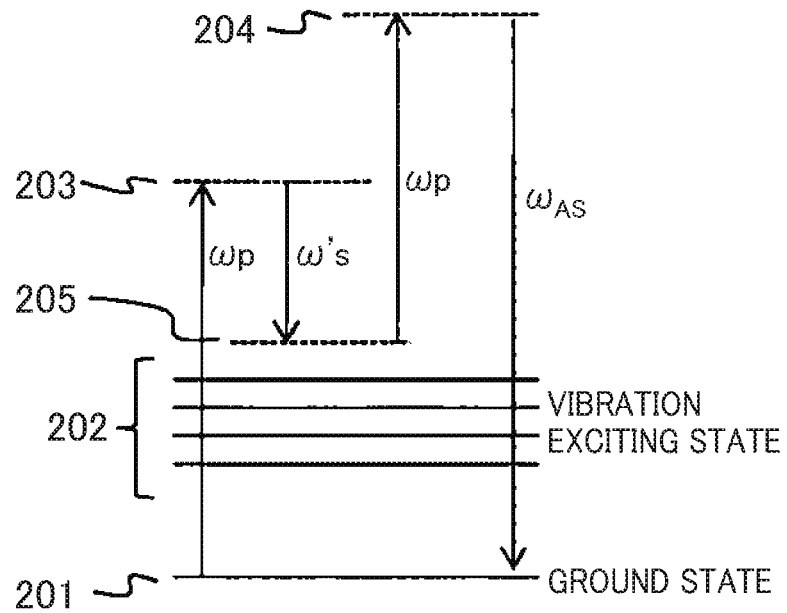
FIG. 3 is one process related to the non-resonance term $\chi nr(3)$.
Figure 4:
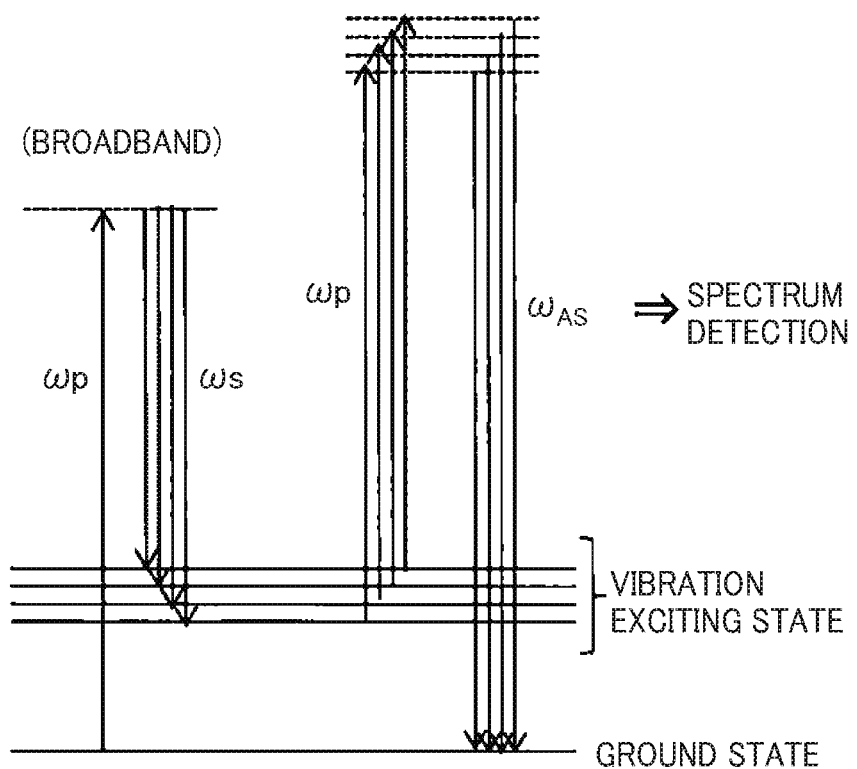
FIG. 4 is an energy level diagram of a multi-color CARS microscope.
Figure 5:
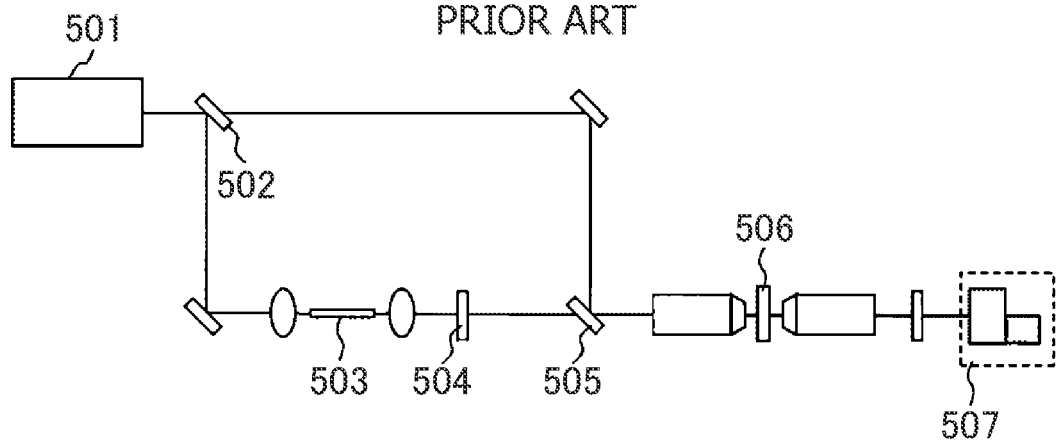
FIG. 5 is a drawing that shows a configuration of a multi-color CARS microscope according to a prior art.

In the present embodiment, an example of an apparatus and motions for reducing the damage by modulating the pulse of the laser will be explained.
(Apparatus Configuration)
FIGS. 1A and 1B are schematic views that show basic configuration examples according to the present invention. The feature of the present apparatus is to include a pulse modulator 120 and a temperature sensor 121 which are controlled by a controller 100. Hereafter, each constituent element will be explained in detail.

The controller 100 controls the entire apparatus including the adjusting mechanism, and includes an interface that executes reception of the measuring instruction from a user and display of the measurement result. A short pulse laser light source 101 emits short laser pulse light based on an instruction of the controller 100. The short pulse laser light source 101 is a titanium sapphire laser, a fiber laser, a micro-chip laser, and the like, and the pulse width is nanosecond or less. Also, it is preferable that the peak power is kilowatt order or more that can induce the non-linear optical effect. Although the wavelength can be selected from the absorption band of the measurement object and the corresponding wavelength of the optical component used, the wavelength can be made 800 nm, 1,064 nm, and so on.

The pulse modulator 120 receives a pulse timing signal of the laser light from the controller 100, decimates the number of pulses of the laser light incident from the short pulse laser light source to a half, ⅓, and the like, and thereby controls the pulse repetition frequency. The present pulse modulator may be configured of a Pockels cell and a ½ wavelength plate, and a high speed shutter and an ND (Neutral Density) filter may be used. Also, the present pulse modulator may be incorporated in the short pulse laser light source 101 as a pulse modulation function. Further, in the description of the present application, such incorporation type also is to be referred to as a pulse modulator.

The laser light modulated by the pulse modulator is made incident to a ½ wavelength plate 102 and a polarization beam splitter 103, and branches into a transmission component and a reflection component by the polarization beam splitter 103 with a power ratio that is based on the polarization direction. The laser light having transmitted the polarization beam splitter 103 is condensed on the end surface of a photonic crystal fiber 105 by a condenser lens 104. The photonic crystal fiber is an optical fiber where honeycomb-like hollow clads are formed around the core, and strongly confines the incident light to the core. By entry of the short pulse laser light, the non-linear optical phenomenon such as the self-phase modulation is induced, and the super-continuum light having a broad spectrum is generated.

The super-continuum light having been generated becomes parallel light by a collimate lens 106, is cut with a short wavelength component by a long path filter 107, thereafter transmits a dichroic filter 108 that reflects the pump light wavelength and transmits the light with other wavelength, and is made incident to an objective lens 113 as the Stokes light.

On the other hand, the laser light having been reflected by the polarization beam splitter 103 is reflected by a mirror 109, a mirror 112, and the dichroic filter 108, and is made incident to the objective lens 113 as the pump light. The objective lens 113 condenses the broadband Stokes light and the pump light multiplexed on the same axis by the dichroic mirror 108 to a sample 114. In order to improve the CARS light generation effect and the spatial resolution, it is preferable that the numerical aperture of the objective lens 113 is on the higher side such as 0.8 or more for example.

In the sample 114, the CARS step described above is induced, and the CARS light with the wavelength corresponding to the molecule kind of the sample 114 is generated. Also, the temperature in the vicinity of the condensing point of the Stokes light and the pump point is measured by the temperature sensor 121. With respect to this temperature sensor, a radiation thermometer may be used. In the case of a cell sample, because water is the main component, the temperature may be obtained by conversion using a camera that observes bubbles generated in the vicinity of the condensing point by the temperature rise, or a hygrometer that monitors evaporated moisture. Further, instead of the temperature sensor, it is also possible to use a camera that directly monitors the shape change by the damage of the cells.

Figure 7:
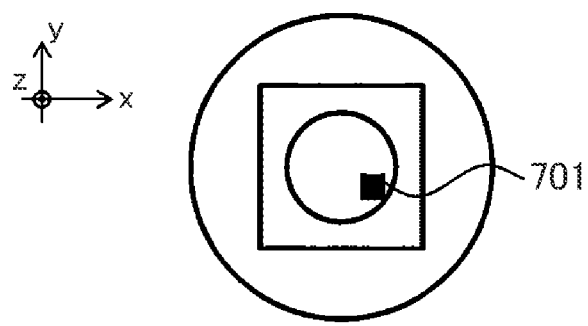
FIG. 7 is an example of a sample of a glass bottom dish.

In the sample 114, a region for learning the pulse frequency condition described below is arranged. For example, in a case a glass bottom dish is made a sample as shown in FIG. 7, a region 701 of 10×10 μm in the lower right of the glass portion may be made a region for learning which is a culture medium only where the cell does not exist. Further, when the learning motion is not executed, this region may be nil.

The CARS light having been generated becomes parallel light by a collimate lens 115, is cut with a transmission component of the pump light and the Stokes light by a notch filter 117 and a short path filter 118, and is made incident to a spectroscope 119. The spectroscope 119 detects the CARS spectrum, and delivers spectrum information to the controller 100.

Figure 6:
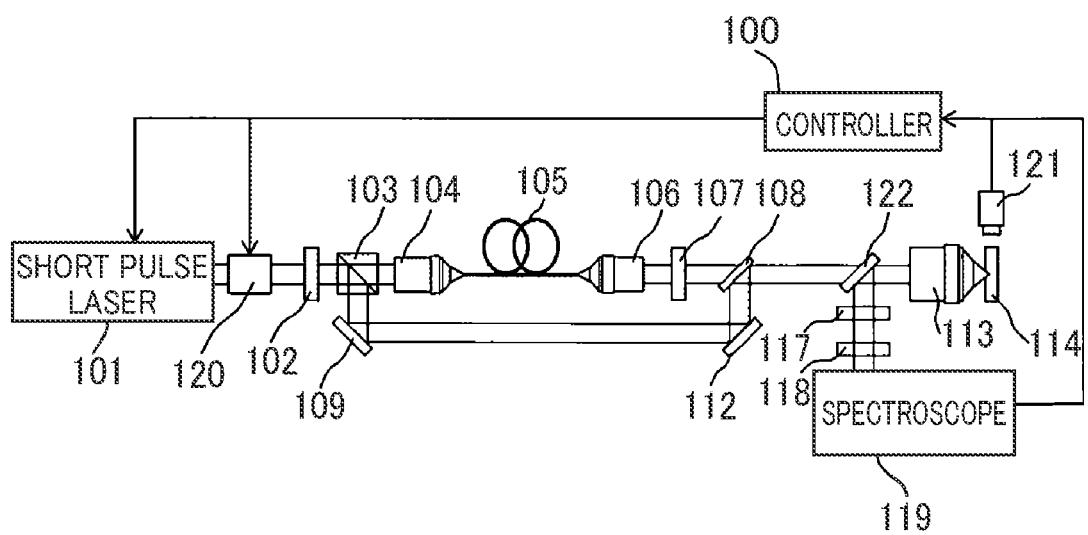
FIG. 6 is a drawing that shows a configuration of a reflection type CARS.

Further, the pulse modulator may be installed at any location as long as it is before condensation to the sample, and may be installed between the dichroic mirror 108 and the objective lens 113 for example. In this case, however, it is required to use a modulator that copes with the broadband light. Furthermore, although the transmission type CARS system is shown in FIGS. 1A and 1B which detects the CARS light propagating in the same direction of the incident direction of the pump light and the Stokes light, reflected CARS light maybe detected as shown in FIG. 6. In this case, the reflected CARS light may be introduced to the spectroscope 119 using a dichroic mirror 122 that reflects light with the wavelength shorter than that of the pump light and allows light with long wavelength to transmit therethrough. Such configuration is useful in measuring a sample that is non-transmissible with respect to the incident laser and a thick sample. Also, the light path of the pump light between the mirror 109 and the mirror 112 may be a fiber optical system using a common single mode fiber and the like similarly to the light path from the condenser lens 104 to the collimate lens 106. The reason is that the device can be made compact.

(Motion of Apparatus)

FIG. 11 shows schematic views of the method for modulating the pulse. (a) is the emission waveform of the laser when modulation is not executed, and laser pulses having predetermined peak power and pulse width are emitted with a predetermined repetition frequency. The average power becomes a value obtained by time-averaging these pulses. (b) is an example of adjusting power by a device of a prior art. By making the peak power ½ without changing the repetition frequency of the pulses, the average power also becomes ½. Such control can be easily achieved by using an ND filter and the like. On the other hand, (c) and (d) are drawings showing pulse modulation methods according to the present invention. (c) is an example in which pulses are decimated by the pulse modulator 120 while the peak power is kept constant and the frequency is made ½. In this case also, the average power becomes ½. Further, (d) is an example in which one pulse is decimated out of three pulses in a similar manner.

FIG. 8 is an example of a flowchart that shows motions of learning and determining the pulse frequency by an apparatus according to the present invention. In S801, the controller 100 executes an instruction to start the learning motion. In S802, the relation between the pulse frequency and the temperature rise after irradiation for a predetermined time, shown in FIG. 9 for example, is acquired. Also, by starting measurement from a region the pulse is not decimated and the pulse frequency is high, the irradiation time can be shortened and the time required for total learning can be shortened. Further, in order to avoid giving damage to the measurement sample in the present motion, the temperature rise of the culture medium may be measured in a region for learning of FIG. 7. The pulse repetition frequency is determined from the specification of the temperature rise amount corresponding to the cell damage in S803, and measurement is started in S804. With respect to such motion, although it is possible to store the result of the first execution in a memory and the like incorporated in the controller 100 and to execute measurement thereafter at the pulse frequency having been determined at the first time without executing learning, the learning motion may be executed in every measurement. When a cell with low signal intensity is to be measured in particular, it is effective to optimize the frequency in every measurement.

(Effect of Invention)

Figure 10:
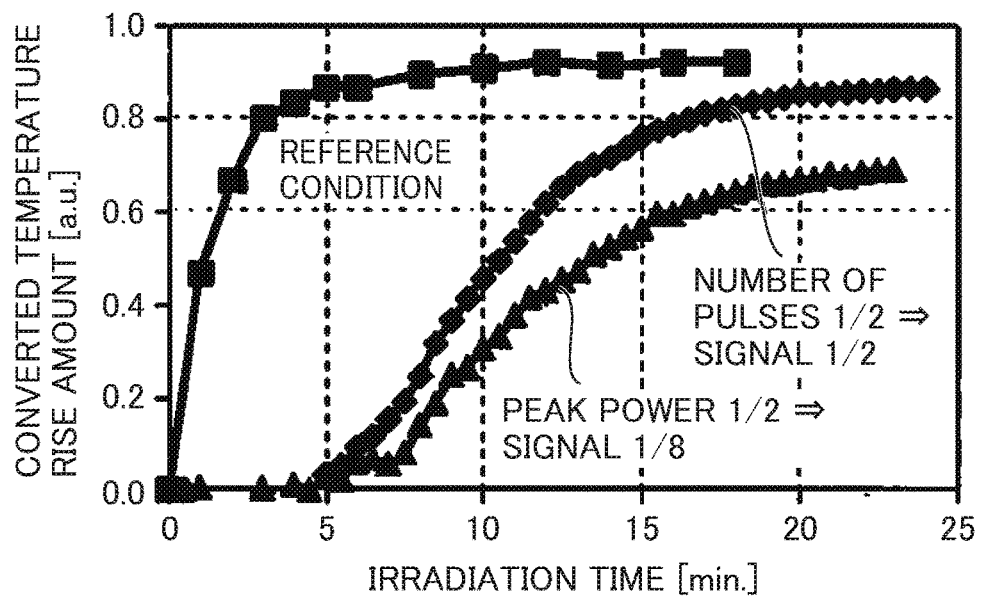
FIG. 10 is a drawing that shows the irradiation time and the temperature rise in the vicinity of the laser condensing point when laser irradiation to a cell sample continues.
Figure 11A:
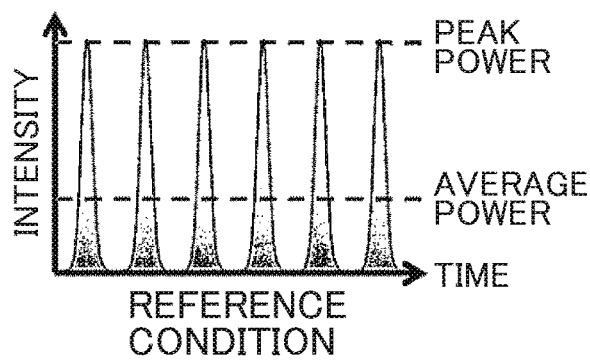
FIGS. 11A to 11D are drawings that show a light emission condition of a laser.
Figure 11B:
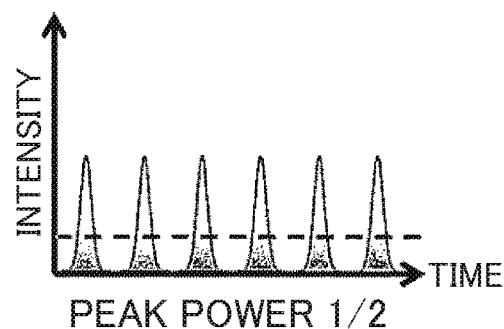
Figure 11C:
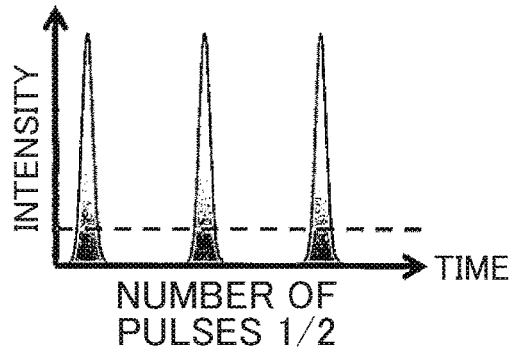
Figure 11D:
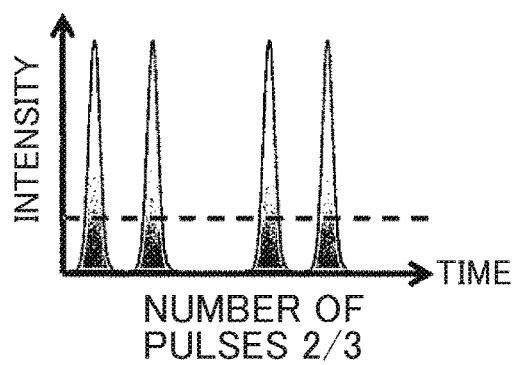

FIG. 10 is a drawing that shows the irradiation time and the temperature rise in the vicinity of the laser condensing point when laser irradiation to a cell sample continues. There is shown comparison of three conditions of a reference condition shown in (a) of FIG. 11, a case the peak power is made ½ as FIG. 11(b), and a case the number of pulses is made ½ as FIG. 11(c). Also, both of the average power of the case the number of pulses is made ½ and the case the peak power is made ½ as described above become ½ with respect to the average number of the reference condition.

When the number of pulses is made ½ with respect to that of the reference condition, the temperature rise is suppressed, and such fact is shown that the impact by the laser irradiation is less in the duration up to approximately 5 minutes similarly to the case the peak power is made ½. In general, since the measurement time per one spatial point is several ms to several tens ms in CARS, it is considered that the damage given to the sample is generally negligible in this case. On the other hand, because the signal intensity is proportional to the cube of the peak power, the signal intensity becomes ⅛ when the peak power is made ½ whereas the signal intensity remains ½ when the number of pulses is made ½. Thus, by executing modulation so as not to irradiate the predetermined pulse, namely, to be more specific, by making the number of pulses ½ or less, in spite of irradiation for a predetermined time, the damage given to the sample can be reduced dramatically. Further, also in the case the power of the pulse is made ½ or less, although the signal intensity reduces, there is an effect of reducing the damage to the sample dramatically.

Figure 12:
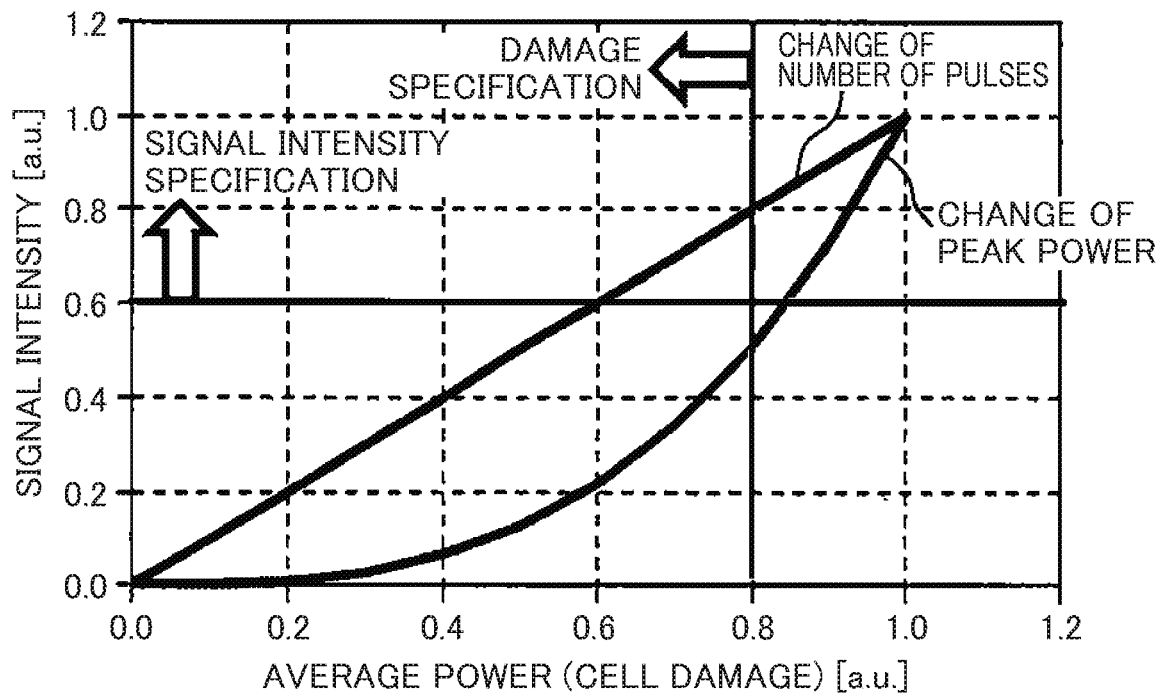
FIG. 12 is a schematic view that shows the relation between the damage and the signal intensity.

FIG. 12 is a schematic view that shows the relation between the damage and the signal intensity described above. When the peak power is changed, the signal intensity reduces by the cube according to reduction of the average power. On the other hand, when the number of pulses is changed, the signal intensity remains to reduce linearly according to reduction of the average power. Here, when the damage specification is assumed to be 0.8 or less and the signal intensity specification is assumed to be 0.6 or more under the assumption that the average power of the laser corresponds to the damage by the temperature rise, only the case of changing the number of pulses satisfies the condition.

By modulating the pulse as the present embodiment, the damage to the sample can be suppressed without significant reduction of the signal intensity compared to the case of reducing the peak power.

Second Embodiment

In the present embodiment, suppression of the damage by controlling the spectrum band of the broadband Stokes light in addition to suppression of the damage by pulse modulation described in the first embodiment will be described.

Figure 13:
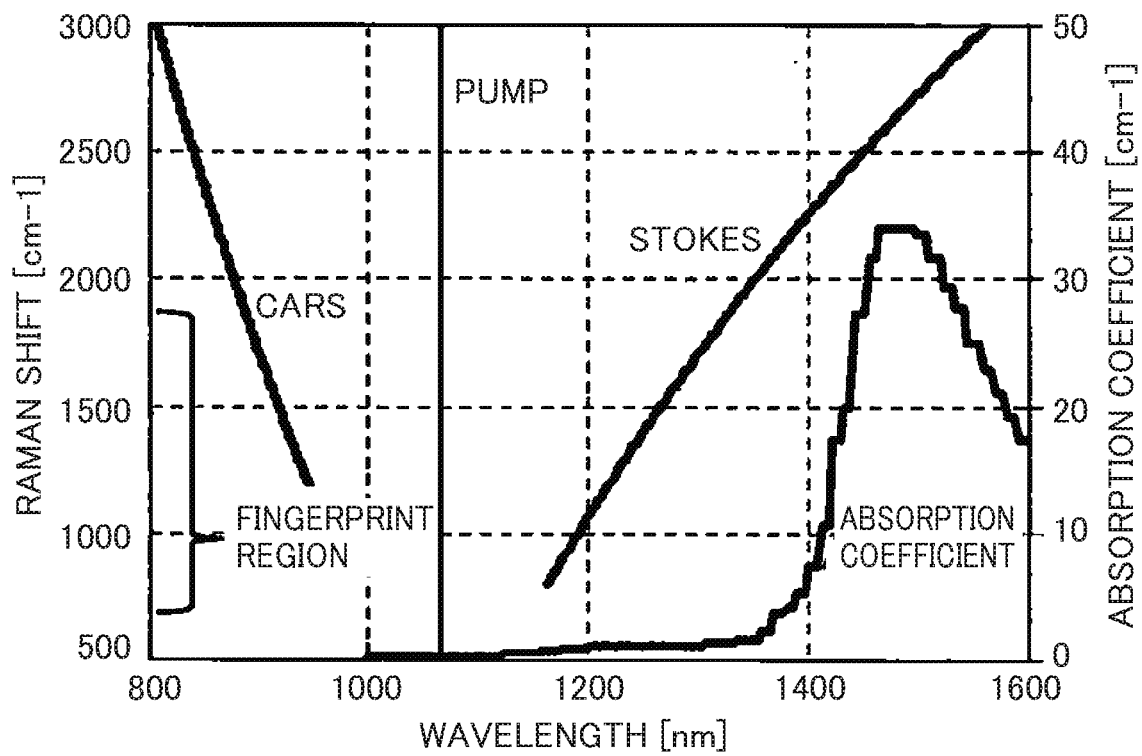
FIG. 13 is a drawing that shows the wavelength of the pump light, the Stokes light, and the CARS light corresponding to Raman shift when the wavelength of the short pulse laser light source is 1,064 nm and the absorption spectrum of water.

When light is irradiated to a biological body, light of 700 nm or less is absorbed by hemoglobin, and light of 1,400 nm or more is absorbed by water that is the main component of the cell. The wavelength band between them has been drawing attention in recent years as a window of a biological body that can observe the inside while suppressing the damage. In multi-color CARS, there is a case that the spectrum band of the broadband Stokes light is included in the absorption band of water according to the wavelength of the short pulse laser light source. FIG. 13 is a drawing that shows the wavelength of the pump light, the Stokes light, and the CARS light corresponding to Raman shift when the wavelength of the short pulse laser light source that becomes the pump light is 1,064 nm and the absorption spectrum of water. Absorption of water increases sharply at 1,400 nm or more, and the long wavelength region of the Stokes light is included in the absorption band when the CARS light is acquired up to 3,000 $cm^{-1}$. On the other hand, when only the fingerprint region is acquired, absorption to water is less with respect to any wavelength. That is to say, the damage to a cell sample whose main component is water can be suppressed. The present inventors paid attention to the relation between the wavelength of the broadband Stokes light in multi-color CARS and the absorption spectrum of water, and newly devised a device and motions suppressing damage to cells and securing a signal intensity.

(Apparatus Configuration)

Figure 14:
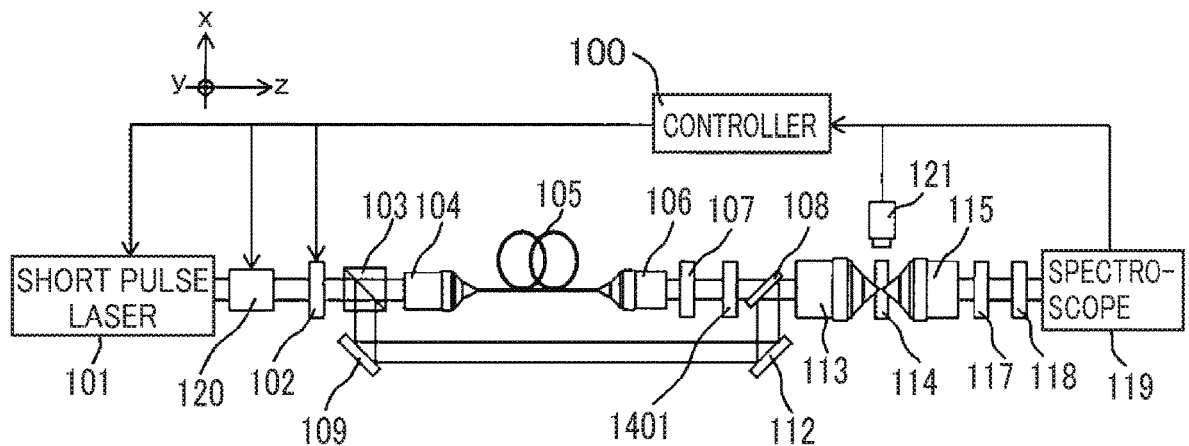
FIG. 14 is a schematic view that shows a basic configuration example that is according to the present embodiment.

FIG. 14 is a schematic view that shows a basic configuration example that is according to the present embodiment. Also, explanation on elements similar to those of the first embodiment will be omitted. As the means for controlling the band of the Stokes light, there can be cited (1) control of incident power to a photonic crystal fiber (will be hereinafter abbreviated as PCF), (2) adjustment of the length of the PCF, and (3) a wavelength filter. The ½ wavelength plate 102 is rotated by a movable holder according to the construction of the controller 100, and changes polarization of the incident laser light to an optional direction. Since the polarization beam splitter 103 changes the power branching ratio of the reflected light and the transmitted light based on the polarization direction of the laser light, the incident power of the PCF changes. The length of the PCF 105 is adjusted so that the Stokes light generated has a desired spectrum band. In general, when the incident power to the PCF is the same, the spectrum tends to widen as the length of the PCF increases. When the band of the Stokes light is to be controlled to 1,400 nm or less, the length can be made 30 cm or more and 1 m or less for example. The Stokes light generated is made incident to a short path filter 1401 that can change the cutoff wavelength, and only desired wavelength component transmits and is multiplexed with the pump light. Further, although such example is shown here which includes all of the mechanism for adjusting the incident power to the PCF, the PCF that has a predetermined length, and the wavelength filter, just one or two of them will do.

Since other configurations are similar to those of the first embodiment, explanation thereon will be omitted.

(Motion of Apparatus)

Figure 15:
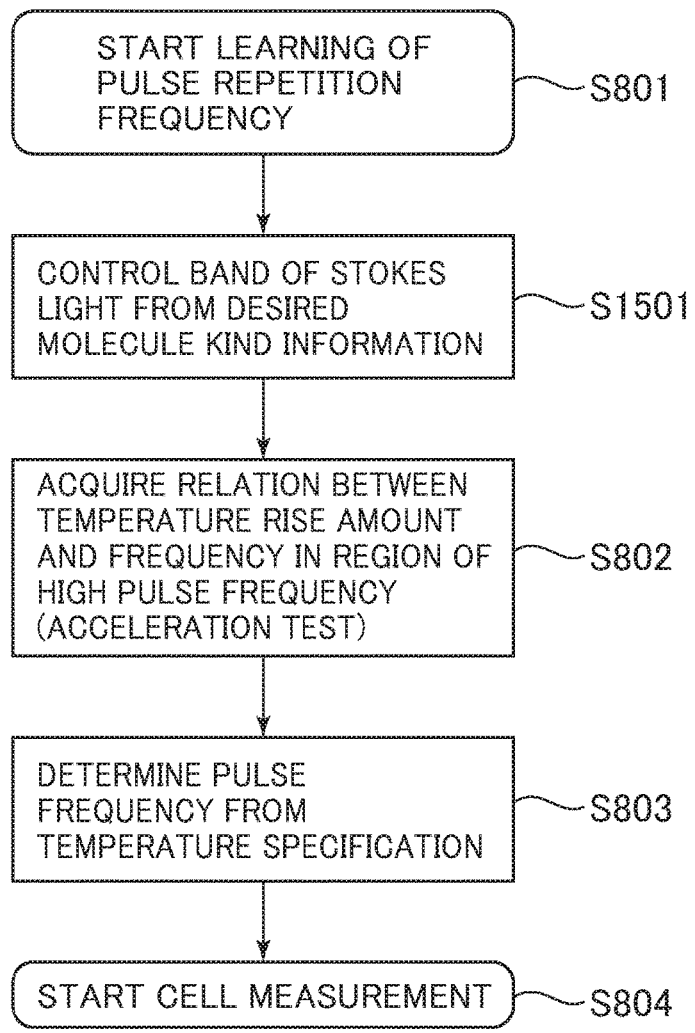
FIG. 15 is an example of a flowchart that shows motions of learning and determining the pulse frequency after an apparatus that is according to the present invention adjusts the band of the Stokes light.

FIG. 15 is an example of a flowchart that shows motions of learning and determining the pulse frequency after an apparatus that is according to the present invention adjusts the band of the Stokes light. Also, explanation on motions similar to those of the first embodiment will be omitted. In S1501, the band of the Stokes light is controlled according to desired molecule kind. For example, the band of the Stokes light is controlled to 1,064 nm that is the pump light wavelength to approximately 1,600 nm when the CH shrinkage signal of approximately 2,900 $cm^{-1}$ is required, and to approximately 1,300 nm when only the fingerprint region is required. For control of the band, adjustment of the incident power to the PCF or the wavelength filter described above can be used. In the case of the former, the relation between the power and the band can be obtained beforehand using a spectroscope. Further, it is also possible to obtain the spectrum of the CARS light and the non-resonance light while changing the incident power to the PCF, and to directly search for a condition with which those spectra widen to a desired wavelength. In this case, the condition of the incident power to the PCF can be searched for in the region for learning of FIG. 7. Since the motions thereafter are similar to those of the first embodiment, explanation thereon will be omitted.

Figure 16:
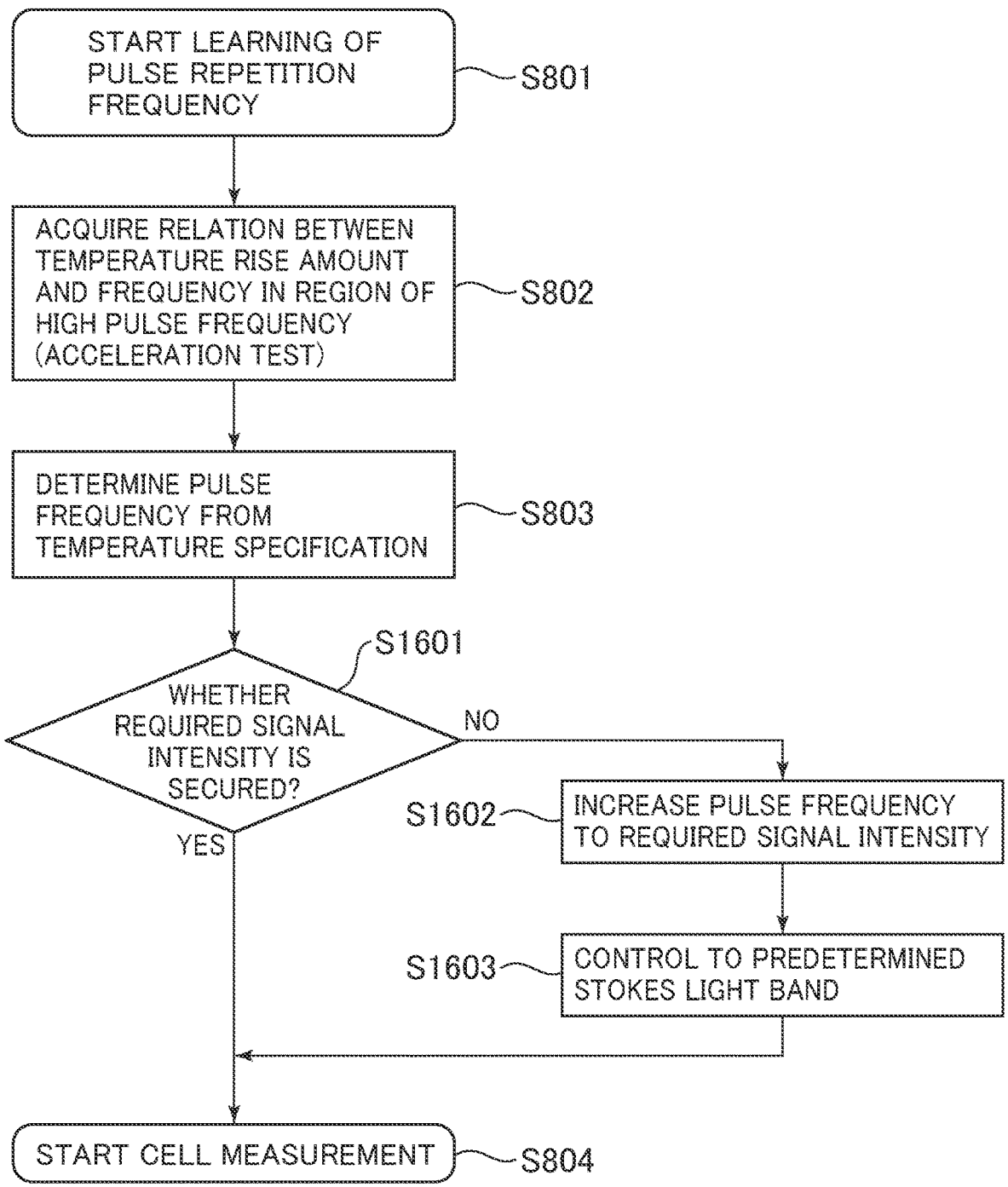
FIG. 16 is an example of a flowchart that shows motions of adjusting the band of the Stokes light after an apparatus that is according to the present invention determines the pulse frequency.

FIG. 16 is an example of a flowchart that shows motions of adjusting the band of the Stokes light after an apparatus that is according to the present invention determines the pulse frequency. As shown in FIG. 12, when the pulse frequency is reduced, the signal intensity reduces although it is a linear change. The motions of FIG. 16 are effective when the signal intensity required for suppressing the damage cannot be secured. In S1601, whether the signal intensity required at the pulse frequency determined has been secured is confirmed. The signal intensity may be determined from the non-resonance light of the culture medium in the region for learning of FIG. 7, or may be determined from the CARS signal intensity while measuring the actual sample. When the signal is equal to or greater than the desired intensity, measurement is started in S804. When the signal is less than the determined intensity, the pulse frequency is increased to the required signal intensity in S1602.

The damage to the sample is suppressed by limiting the band of the Stokes light in S1603, and measurement is started in S804. Also, since other motions are similar to those of the first embodiment, explanation thereon will be omitted. Further, with respect to the timing of learning also, learning may be executed only in the first time or may be executed at every measurement similarly to the first embodiment.

(Effect of Invention)

Figure 17:
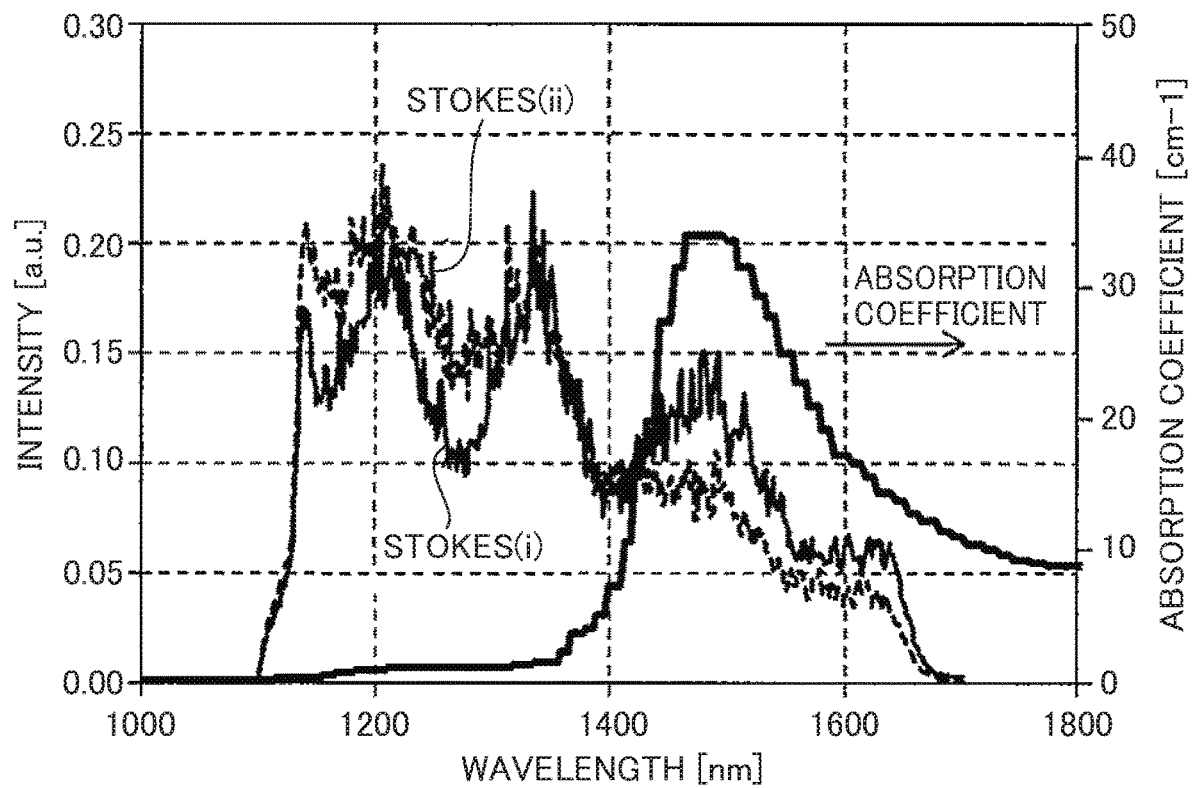
FIG. 17 is a drawing that shows spectra of two kinds of the broadband Stokes light and the absorption spectrum of water.
Figure 18:
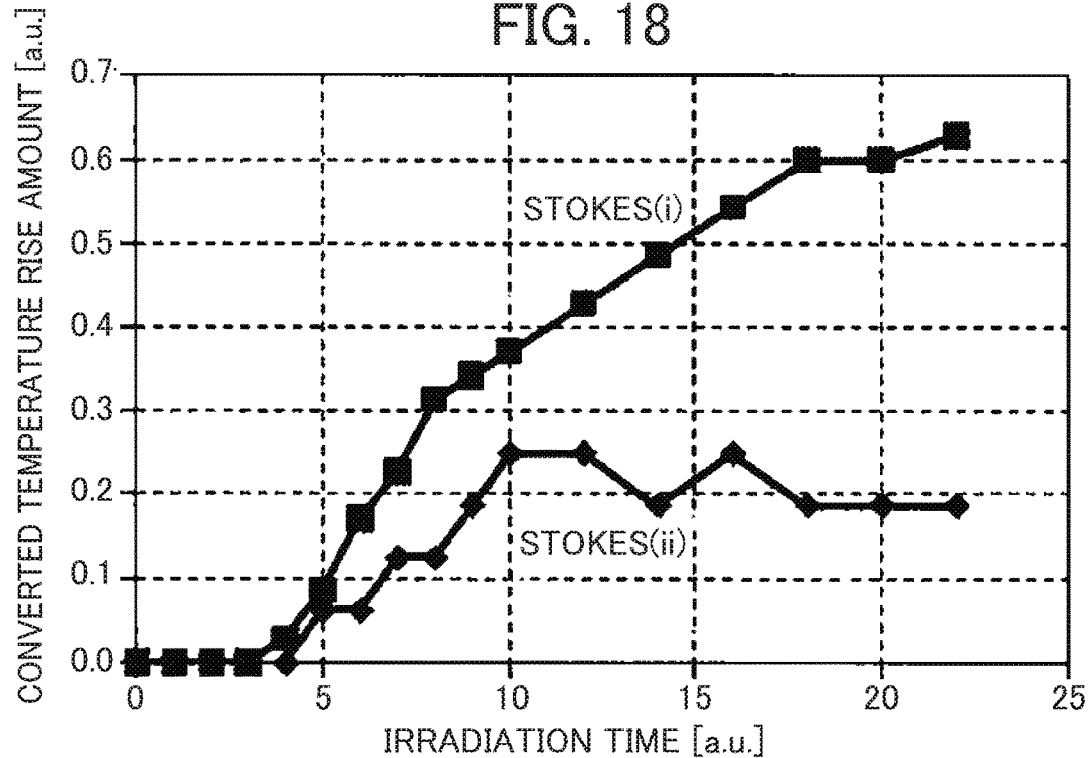
FIG. 18 is a drawing that shows the irradiation time and the temperature rise in the vicinity of the laser condensing point when irradiation of two kinds of the Stokes light to a cell sample continues.

The relation between the spectrum of the Stokes light and the damage to the sample will be explained. FIG. 17 is a drawing that shows spectra of two kinds of the broadband Stokes light and the absorption spectrum of water. The long wavelength region of the Stokes light is included within the absorption band of water, and in the case of (i) in particular where the spectrum band is broad, there is a possibility of the cell damage by the temperature rise. FIG. 18 is a drawing that shows the irradiation time and the temperature rise in the vicinity of the laser condensing point when irradiation of two kinds of the Stokes light described above to a cell sample continues respectively. The temperature rise rate of (ii) is lower compared to Stokes (i), and the damage to the sample is suppressed.

The damage to the sample can be suppressed further by executing limiting of the band of the Stokes light in addition to control of the pulse frequency as was done in the present embodiment. In particular, by the configuration of FIG. 14, the incident power to the PCF is limited, the access power is allocated to the pump light, and thereby it can be expected that the signal intensity will increase.

Also, in Japanese Unexamined Patent Application Publication No. 2015-7612, although a technology of "when there is a combination in which both of the first and second wavelength become 700 nm or more and 1,400 nm or less in the combination of the first and second wavelength achieving a measurement wavenumber set by wavenumber setting means, such combination is selected by light source adjusting means" is described, a method for selecting the wavelength is shown in a so-called monochrome CARS using light with a single wavelength for the pump light and the Stokes light, and there is no description on control of the broadband light of the multi-color CARS which is a subject of the present application.

Third Embodiment

In the present embodiment, suppression of the damage by controlling the spectrum band of the broadband Stokes light will be described.

Figure 19:
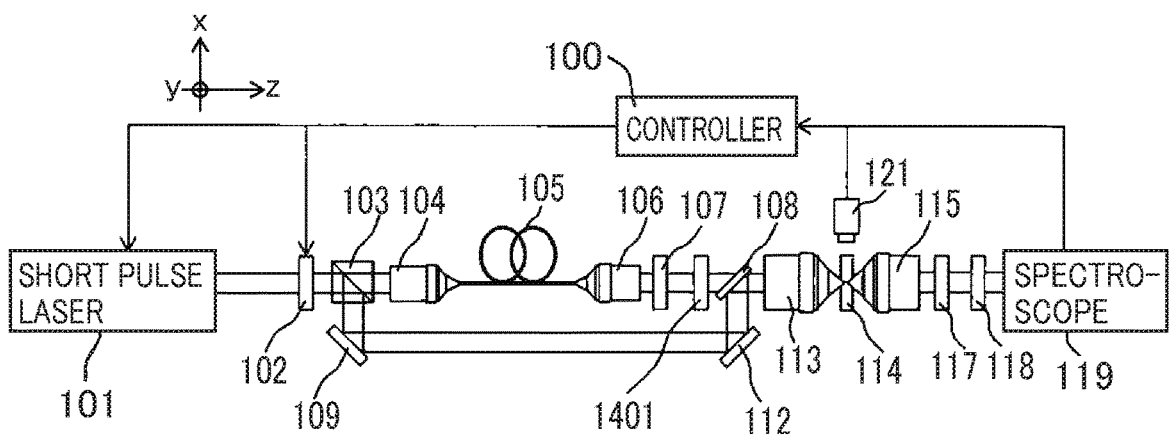
FIG. 19 is a schematic view that shows a basic configuration example that is according to the present embodiment.

FIG. 19 is a schematic view that shows a basic configuration example that is according to the present embodiment. Compared to FIG. 14 of the second embodiment, by omission of the pulse modulator 120, a simpler configuration has been achieved. Such configuration is effective when miniaturization is required such that it is incorporated into a cell culture apparatus for example. Since other elements are similar to those of the second embodiment, explanation thereon will be omitted.

Figure 20:
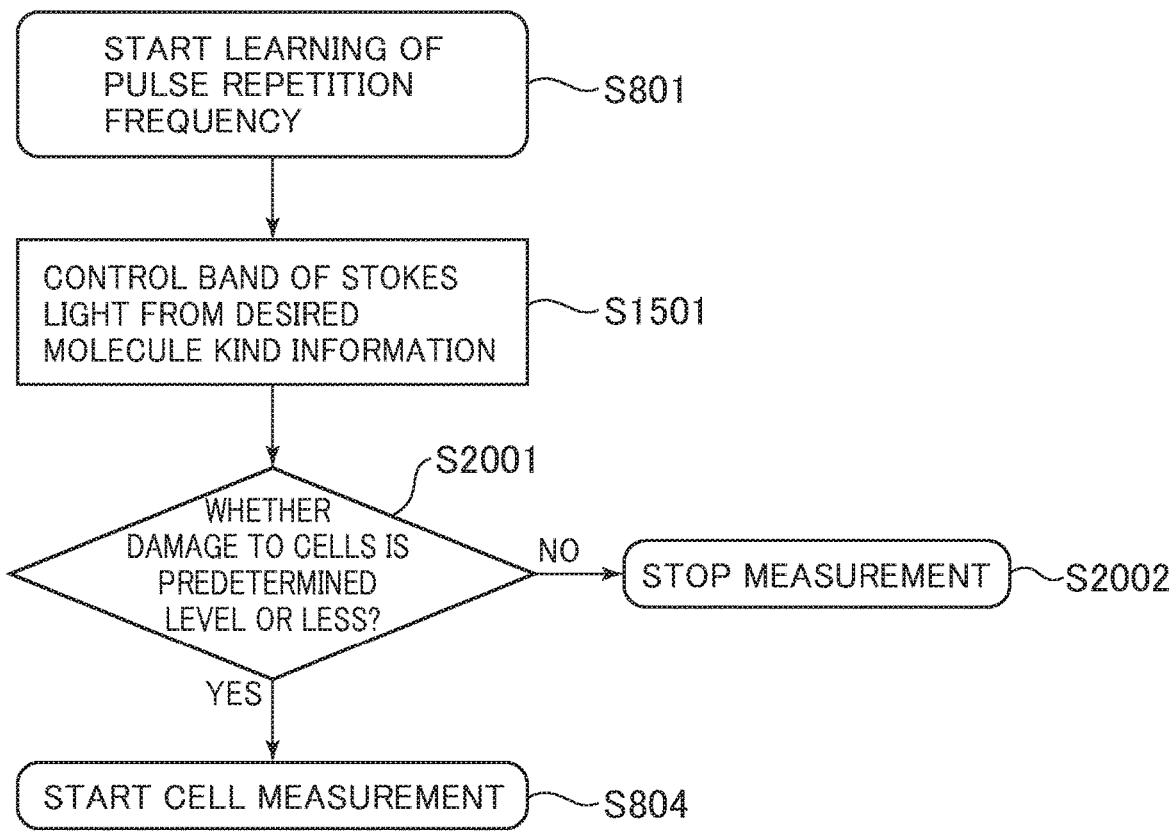
FIG. 20 is an example of a flowchart that shows a motion of adjusting the band of the Stokes light by an apparatus that is according to the present invention.

FIG. 20 is an example of a flowchart that shows a motion of adjusting the band of the Stokes light by an apparatus according to the present invention. After the spectrum of the Stokes light is limited to a band that contributes to the fingerprint region for example in S1501, the damage to the sample is confirmed in S2001. The temperature rise of the culture medium in the region for learning of FIG. 7 only has to be monitored for confirming the damage which is only one condition determined in S1501, and therefore it is not necessary to carry out the acceleration test. When the damage is a predetermined amount or smaller, measurement of the cell is started. On the other hand, when the damage is the predetermined amount or larger, measurement is stopped.

According to the present embodiment, since it suffices to remove unnecessary components out of the spectrum of the broadband Stokes light, the damage to the sample can be suppressed without reducing the intensity of the signal band required.

REFERENCE SIGNS LIST

100 Controller
101 Short pulse laser light source
102 ½ wavelength plate
103 Polarization beam splitter
104 Condenser lens
105 Photonic crystal fiber
106 Collimate lens
107 Long path filter
108 Dichroic mirror
109 Mirror
112 Mirror
113 Objective lens
114 Sample
115 Objective lens
117 Notch filter
118 Short path filter
119 Spectroscope
120 Pulse modulator
121 Temperature sensor
122 Dichroic mirror
201 Ground state of molecule
202 Vibration exciting state
203 Intermediate state
204 Intermediate state
205 Intermediate state
501 Short pulse laser light source
502 Beam splitter
503 Photonic crystal fiber
504 Long path filter
505 Dichroic mirror
506 Sample
507 Spectroscope
701 Region for learning
1401 Short path filter

The invention claimed is:

1. An optical measurement apparatus, comprising:
a short pulse laser light source;
a modulator that is arranged in a light path between the short pulse laser light source and a sample and modulates power of predetermined pulses out of pulses of laser light so as to reduce the power, the laser light being generated from the short pulse light source;
a splitter that branches emission light from the short pulse laser light source into a first light flux and a second light flux;
an optical fiber that generates super-continuum light from the first light flux;
a mirror that multiplexes Stokes light and pump light, the Stokes light being a long wavelength component out of the super-continuum light, the pump light being the second light flux;
a lens that condenses light multiplexed by the mirror a sample; and
a spectroscope that detects light generated from the sample, wherein
the modulator is arranged between the short pulse laser light source and the splitter.

2. The optical measurement apparatus according to claim 1, wherein the modulator modulates the predetermined pulses so as not to irradiate.

3. The optical measurement apparatus according to claim 1, wherein the modulator reduces number of pulses of the laser light to ½ or less.

4. The optical measurement apparatus according to claim 1, wherein the modulator reduces power of predetermined pulses of the laser light to ½ or less.

5. The optical measurement apparatus according to claim 1, wherein the modulator is incorporated in the short pulse laser light source.

6. The optical measurement apparatus according to claim 1, further comprising spectrum adjusting means for adjusting a spectrum of the super-continuum light so as to reduce an intensity in an absorption band of water.

7. The optical measurement apparatus according to claim 6, wherein the absorption band of water is from 1,400 nm to 10,000 nm.

8. The optical measurement apparatus according to claim 6, wherein the spectrum adjusting means is light amount ratio adjusting means for adjusting a light amount ratio of the first light flux and the second light flux in the splitter.

9. The optical measurement apparatus according to claim 6, wherein the spectrum adjusting means is a wavelength filter that is arranged in a light path of the first light flux.

10. The optical measurement apparatus according to claim 6, wherein the spectrum adjusting means is the optical fiber with a length of 30 cm or more and 1 m or less.

11. The optical measurement apparatus according to claim 6, wherein the spectrum adjusting means controls power incident to the optical fiber.

12. An optical measurement apparatus, comprising:
a short pulse laser light source;
a splitter that branches emission light from the short pulse laser light source into a first light flux and a second light flux;
an optical fiber that generates super-continuum light from the first light flux;
spectrum adjusting means for adjusting a spectrum of the super-continuum light so as to reduce an intensity in an absorption band of water;
a mirror that multiplexes Stokes light and pump light, the Stokes light being a long wavelength component out of the super-continuum light, the pump light being the second light flux;
a lens that condenses light multiplexed by the mirror on a sample; and
a spectroscope that detects light generated from the sample.

* * * * *